INVENTOR
WILLIAM B. REEVES
EDWARD L. UTSINGER
BY
ATTORNEY

Patented May 2, 1944

2,347,751

UNITED STATES PATENT OFFICE 2,347,751

PUMPING SYSTEM

William B. Reeves and Edward L. Utsinger, Phillips, Tex., assignors to Phillips Petroleum Company, a corporation of Delaware Application June 2, 1941, Serial No. 396,368

5 Claims. (Cl. 103—111)

This invention relates to an arrangement of apparatus incorporated in a pumping system for maintaining a seal on stuffing boxes whereby a fluid being pumped is prevented from escaping from said stuffing boxes. Our invention particularly relates to improvements in stuffing box sealing methods which are especially adapted for use on stuffing boxes of centrifugal and rotary pumps in oil refineries, in pipe lines, and other places where oils and especially volatile liquids are pumped.

Various methods have heretofore been proposed for preventing egress of fluid through glands or stuffing boxes of pumps which operate under superatmospheric pressure. In practice, fluid used to seal stuffing boxes of such pumps must be maintained at a pressure equal to or greater than the pressure of the fluid being pumped and held inside of stuffing boxes. In conventional systems the pressure on sealing fluid is varied from atmospheric to values appreciably greater than the pressure inside stuffing boxes by pumping means which are quite well described in the art.

When these pressures inside of packing glands are of the order or about 1000 pounds per square inch, for example, it is difficult to find small pumps which will supply sealing fluid continuously to the outside of these glands under such conditions without giving trouble.

In some centrifugal pumps sealing fluid for stuffing boxes and packing glands is substantially the same composition as the fluid being pumped and is taken from the effluent stream of the pump. In such systems, since the discharge pressure of the pump is usually greater than the pressure inside of the stuffing boxes, there is a steady ingress of fluid through the packing material to the interior of the pump.

Similarly as the pressure on this fluid is usually greater than the pressure surrounding the exterior of the pumping system there is an egress of said fluid, which in this case is the same as the fluid being pumped through stuffing boxes and packing glands, to the atmosphere. This method of sealing is usually employed to prevent the entrance of air to the interior of pumps through packing glands and is obviously unsuitable where an inflammable or otherwise dangerous fluid is being pumped under superatmospheric pressure conditions, such as one which is normally gaseous and extremely non-viscous.

In other pumping systems packing glands are sealed with a non-circulating fluid. That is, sealing fluid is not circulated continuously to stuffing boxes but sent to the boxes and maintained there under a more or less static condition at a predetermined pressure. Such systems are disadvantageous if heat tends to develop in and around the bearings and packing glands and are, therefore practically prohibited from use when highly inflammable, low flash-point fluids are being pumped.

Our invention comprises essentially a device for maintaining a seal on stuffing boxes and/or packing glands for pumps, compressors and similar equipment by means of sealing fluid, different from the fluid being pumped, and in cooperation with chambers, which provide proper communication between various units of a pumping system to be hereinafter described. When pumps discharge volatile liquids such as methane, $C_2$, $C_3$, $C_4$, and $C_5$ hydrocarbons or volatile mixtures containing these hydrocarbons where $C_2$, $C_3$, $C_4$ and $C_5$ refer to hydrocarbons having two, three, four and five carbon atoms per molecule, and at high pressures such as between 100 and 5000 pounds per square inch, or more, their stuffing boxes must be securely sealed to prevent escape of liquids, being pumped through packing glands or otherwise. In order to accomplish this, a sealing liquid is often passed to these stuffing boxes at pressures above the discharge pressures of the pumps. It is in connection with the control of the pressure of such sealing liquids, insofar as said pressure relates to the discharge pressure of the pumps whose stuffing boxes are being sealed, that my invention pertains.

An object of the present invention is to provide means whereby a pump can be operated at relatively high pressures, with not appreciable loss of fluid being pumped through packing glands of stuffing boxes of said pump.

Another object of this invention is to provide means for passing a sealing fluid to the interior of stuffing boxes, etc., of pumps operating under high pressure.

Another object of this invention is to pass a sealing liquid to stuffing boxes of pumps operating under high pressure by means of an auxiliary pump in a manner such that the load, or differential pressure developed by the auxiliary pump is substantially at a minimum.

A further object of this invention is to provide means for controlling the pressure and flow of sealing liquid to stuffing boxes of a pump or pumps to maintain a predetermined positive pressure differential between the sealing liquid and a fluid being retained by or held on the inside of stuffing boxes.

Another object of the invention is to provide means for removing heat, at least in part, developed in the area of stuffing boxes, packing glands, etc., in connection with shafts and bearings of pumps with which they are associated.

Further objects and advantages of the invention will be apparent from the accompanying discussion and disclosure.

The sealing fluid used in our system is preferably a liquid material having a greater viscosity than the fluid being pumped and a very high flash-point and/or ignition-point and preferably non-inflammable, although we do not wish to be limited to using a material having the latter characteristic in the most restricted sense of the word, since oftentimes a material having characteristics of a viscous lubricating oil provides an ideal type of sealing liquid for packing glands and is successfully used in practicing our invention. The sealing liquid in our pumping system is maintained at a pressure dependent, in part at least, on the discharge pressure of the fluid being pumped. The aforementioned chambers provide means of communication between the material being pumped and the sealing liquid to the glands of the pump.

One of the chief advantages of our invention resides in the feature that there is no inherent discontinuity of operation of our pumping system except through mechanical failure of equipment. Also, the pressure maintained on the sealing liquid is not controlled manually but is dependent on the discharge pressure of the pump whose stuffing boxes are being sealed. Our invention will find application when such discharge pressure is any value, within the limits of the strength of the materials employed and dependent on the nature of the material being pumped. It will find particular application, however, for pumping normally gaseous hydrocarbons within the range of 100 to 5000 pounds per square inch. Other advantages of the present invention will best be understood from a description of a preferred form of pumping system embodying the invention. For thus purpose, reference is made to the accompanying drawings.

Figure 1:
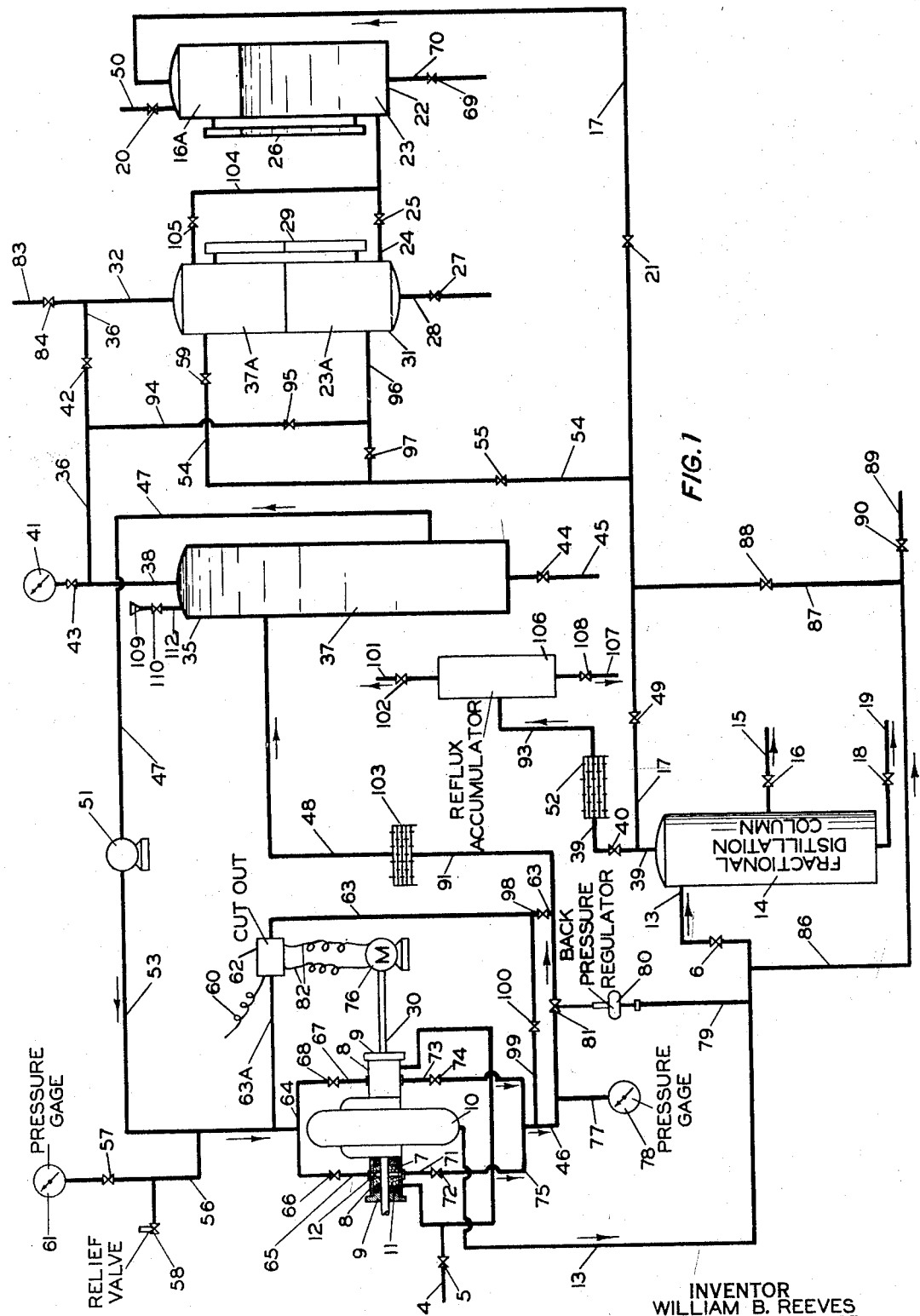
Figure 1 is a flow diagram representing a pumping system embodying various features of our invention, shown partly in section.

In Figure 1, a rotary type pump 10 has a driven shaft 30 journalled in bearings of said pump. The shaft 30 is driven by power means 76, such as an electric motor, and is surrounded, in part, with stuffing boxes 8. Stuffing boxes 8 comprise packing material 7, packing glands 11 and gland nuts 9. The stuffing boxes also comprise lantern glands 12, although it is not imperative that such glands be employed in the application of our invention if sealing liquid can circulate through the stuffing boxes by other means.

In one manner of applying our invention the fluid charged to pump 10 enters the interior or casing of said pump near the axis of the impeller through conduit 4 controlled by valve 5 and is discharged through conduit 13. When valve 6 is closed this fluid may be removed through conduits 86 and 89 and valve 90 thereafter undergoing various treatments if desired.

A pump 51, preferably of a centrifugal or rotary type, driven by power means not shown discharges a sealing liquid 37 through conduit 53, manifold 64, and conduits 65 and 67 controlled by valves 66 and 68, respectively, to stuffing boxes of pump 10 at a pressure dependent to a great extent upon the discharge pressure of pump 10. When fluid discharged by pump 10 is appreciably miscible with the sealing liquid 37, conduit 87, controlled by valve 88 and conduit 17, controlled by valve 21, valve 55 being closed, provide communication between conduit 86 and chamber 22, the latter being in communication with chamber 31, which in turn communicates with the sealing liquid 37.

Chamber 22 contains a fluid phase 16A and a liquid phase 23. The material in the communication conduits 87 and 17, and in the fluid phase 16A of chamber 22 comprises essentially a portion of fluid discharged by pump 10 collected from conduit 86. Liquid 23 in chamber 22 is one which is substantially immiscible and not chemically reactive with either fluid discharged by pump 10 or with sealing liquid which is passed to a stuffing box of pump 10. Chamber 22 is in communication with chamber 31 through conduit 24 controlled by valve 25 or through conduit 104 controlled by valve 105.

When the sealing liquid, such as is passed to a stuffing box of pump 10, has a specific gravity less than liquid 23, communication between chambers 22 and 31 is through conduit 24. Then phase 23A in chamber 31 has substantially the same composition as liquid 23 in chamber 22 and phase 37A in chamber 31 comprises a portion of and has substantially the same composition as the sealing liquid represented by the numeral 37 in container 35.

When, however, the sealing liquid to a stuffing box of pump 10 has a specific gravity greater than liquid 23, communication between chambers 22 and 31 is through conduit 104. Then phase 37A corresponds to liquid 23 in chamber 22 and phase 23A corresponds to the sealing liquid 37 in container 35.

Chamber 31 is in communication with container 35 either through conduits 32, 36 and 38 and valve 42 when valves 84 and 95 are closed or through conduits 96, 94, 36, and 38 and valve 95 when valves 97 and 42 are closed, depending, respectively, whether phase 37A in chamber 31 is essentially sealing liquid or liquid substantially of the same composition as liquid 23 in chamber 22.

Disregarding pressure drop, as a result of frictional losses through various conduits, the discharge pressure of pump 10 is thus communicated to the sealing liquid which is used to seal stuffing boxes of pump 10.

A simpler method for communicating the discharge pressure of pump 10 with the sealing liquid 37 is possible when the fluid in conduits 13 and 86 is substantially immiscible with the sealing liquid 37. Under these conditions the use of a third material as represented by numeral 23 is unnecessary and valve 21 is closed. Said pressure is communicated between conduit 86 and chamber 31 through conduits 87 and 54 controlled by valves 88 and 55, respectively. When the fluid discharged by pump 10 has a specific gravity less than the specific gravity of the sealing liquid, it appears as phase 37A in chamber 31 and valve 59 is opened and valve 97 is closed. Phase 23A is then essentially sealing liquid. When, however, the fluid discharged by pump 10 has a specific gravity greater than the specific gravity of the sealing liquid, it appears as phase 23A in chamber 31 and valve 97 is opened and valves 95 and 59 are closed. Phase 23A is then essentially the same composition as the fluid discharged by pump 10 and phase 37A comprises substantially sealing liquid.

The sealing liquid phase in chamber 31 then communicates with the sealing liquid in container 35 through alternative means previously discussed.

Figure 2:
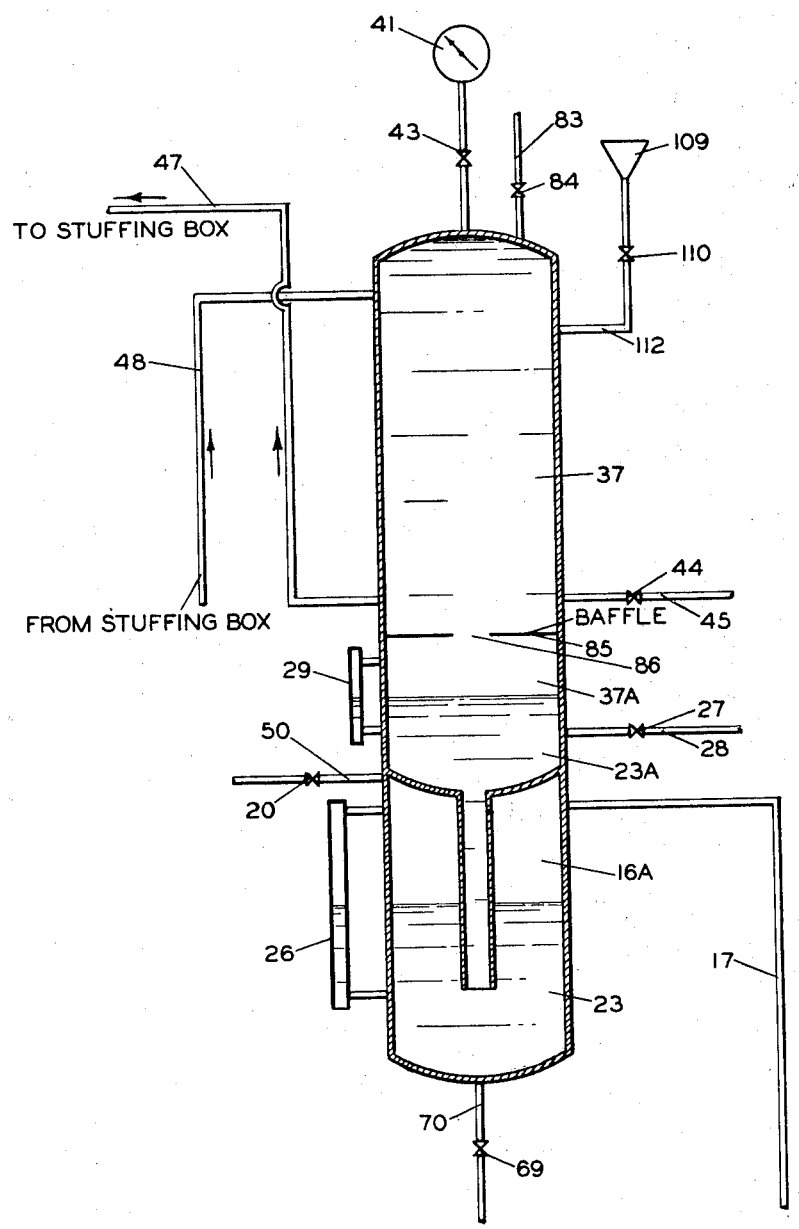
Figure 2 is a diagrammatical sketch of a chamber representing a specific modified feature of our invention.

When fluid discharged from pump 10 is miscible and/or capable of reacting with the sealing liquid, a liquid phase non-reacting and/or immiscible with said fluid and sealing liquid, such as liquid 23 in chamber 22, is necessary in the operation of our pumping system. Under these conditions and in the specific situation when the latter liquid has a specific gravity greater than the fluid discharged by pump 10, the chambers 22, 31 and 35 can be incorporated into one specially designed vessel as illustrated by the drawing in Figure 2. Like numerals in Figures 1 and 2 designate parts performing like functions. The orifice 86 in baffle 85 in Figure 2 corresponds to the communication conduits 32, 36, and 38 and valve 42 in Figure 1. Baffle 85 finds application in such pumping systems where sudden surges of fluid are not uncommon, in which event orifice 86 is of such dimensions as to offer resistance to such surges in much the same manner as a constriction in conduits 32, 36 and/or 38 of Figure 1, such as the valve 42 in conduit 36. In many instances, however, such resistance to flow may not be necessary. The operation of the vessel shown in Figure 2 in connection with a pumping system is substantially the same as previously discussed in connection with operating chambers 22, 31, and 35 of Figure 1 under like conditions.

If during operation of the pumping system the quantity of sealing liquid 37 should decrease, additional sealing liquid may be charged to the unit by suitable means such as a hydraulic pump, through the means 109 and conduit 112 controlled by valve 110 and without interruption of any part of the pumping system. Conversely when it is desirable to remove any part or all of the sealing liquid from the system, this may be done by opening valve 44 in conduit 45. Also, if it is desirable to remove any part or all of liquid 23, when such liquid is used, valve 69 in conduit 70 may be opened. In order to remove any part or all of the material from chamber 31, valve 27 in conduit 28 is opened. Gases and/or vapors which may be contained in chambers 22 and/or 31 may be vented through conduit 50 and valve 20 and/or conduit 83 controlled by valve 84, respectively. When it is desirable to remove any gaseous and/or vaporous material which may exist in container 35, this may be accomplished by opening valves 42 and 84 and allowing such material to escape through conduit 83. Gauge glasses 26 and 29 on chambers 22 and 31, respectively, show the levels of the various fluids contained in such chambers throughout the operation of the pumping system.

The sealing liquid pump 51 takes suction through conduit 47 from container 35 at a pressure substantially equal to the pressure communicated through conduits 87 and 17 to the sealing liquid 37. Sealing liquid is discharged from pump 51 through conduit 53 to manifold 64. From manifold 64 sealing liquid passes to the stuffing boxes 8 of pump 10 through conduits 65 and 67 controlled by valves 66 and 68, respectively, and is passed around packing material 7, and packing glands 11. Sealing liquid passes from the stuffing boxes 8, through conduits 71 and 73 controlled by valves 72 and 74, respectively, through manifold 75 and thence through conduit 46, back pressure valve 81, conduit 91, cooler 103, and conduit 48 to container 35.

Although cooler 103 is for the purpose of removing excessive quantities of heat from sealing liquid, such as heat which may be imparted to the sealing liquid during its passage through the stuffing boxes 8 or otherwise, container 35, which provides facilities for storing a sufficient quantity of sealing liquid, may also be designed to remove heat from sealing liquid, either instead of or in addition to cooler 103. In some instances, however, sealing liquid from a stuffing box is sufficiently cool to recirculate to the stuffing box as such, in which case cooling devices may be omitted.

Back pressure valve 81 controls the pressure held on the packing glands and in the stuffing boxes of pump 10 by constricting the flow of sealing liquid from pump 51. Valve 81 is actuated by pressure from conduit 13 through communication pipe 79. The pressure so communicated through pipe 79 acts on regulator 80 which in turn controls the valve 81. Thus, for example, if the back pressure valve is set at fifty pounds per square inch above the discharge pressure of pump 10 as measured in pipe 79, a constant differential of fifty pounds per square inch may be maintained between the pressure in stuffing boxes 8 and the pressure in pipe 79 at any pressure maintained in pipe 79 over a wide pressure range.

Thus it is seen that the only differential across pump 51 is the small amount of extra head required for sealing, in the example cited about fifty pounds per sqare inch. The load on pump 51 is thereby much less than when said pump is required to raise the pressure of the sealing liquid from a low value to an amount greater than the discharge pressure of pump 10 and particularly when pump 10 is discharging fluid at a pressure upwards of 500 pounds per square inch.

Back pressure valve 81 may be set at any desired pressure differential deemed suitable for the successful operation of the pumping system and within the mechanical limits of the equipment. Once adjusted or set, it will maintain a constant pressure differential between conduit 13 and conduit 46 at any pressure which exists in conduit 13 providing, of course, that conduit 13 is either in direct or indirect communication with sealing liquid 37 by means herein described. Also, if it is desirable, valve 81 may be so adjusted to maintain a negligible back pressure in conduit 46, whereupon the pressure on the sealing liquid is substantially the same as the discharge pressure of pump 10.

Numeral 62 indicates a cut-out means, preferably electrically operated when power means 76 is an electric motor, which is in communication with conduits 53 and 91 through pipes 63 and 63A controlled by valve 98 when valve 100 is closed. During satisfactory operation of the pumping system, a differential exists between the pressure on the sealing liquid in line 53 and the pressure on the sealing liquid in line 91 as a result of pressure drop through the stuffing boxes and certain conduits and action of the back pressure valve 81. If pump 51 stops or if for some reason of imperfection of mechanical units, such as failure of valve 81 to function properly, the flow of sealing liquid ceases, conduits 53 and 91 will be under substantially the same pressure. Under these conditions cut-out means 62 is so adjusted that it will operate to shut down power means 76, thereby preventing damage to pump 10. If it is considered desirable, valve 100 may be opened and valve 98 closed to allow communication of cut-out means 62 between conduits 53 and 46 through pipes 63A, 63 and 99. Cut-out means 62 will function essentially as before, although the pressure difference across such means will be less than when it is in communication between conduits 53 and 91 and by an amount substantially equal to the back pressure effect created by valve 81 in the former case.

Means 82 for communication between cut-out means 62 and pump driving means 76 and a similar communication means 60 between cut-out means 62 and external sources of energy aid in controlling the system.

Unit 76 may be any desirable power means for operating pump 10, such as a steam turbine, electric motor and the like. When unit 76 is an electric motor for example, means 60 and 82 will be lines for conducting electrical energy, and means 62 will be a pressure responsive electrical relay mechanism, generally well known in the art.

If the pressure in conduits 53, 65, and 67 and manifold 64 becomes abnormally high as a result of some obstruction in the sealing liquid pumping system or otherwise, relief valve 58 is so adjusted that the pressure in conduit 53 can be released when it reaches a predetermined maximum, above which it would be considered hazardous to operate said pumping system. The pressure existing in conduit 53 can be recorded by pressure gauge 61 when valve 57 is open. For example, if the discharge pressure of the fluid in conduit 13 is substantially constant at about 950 pounds per square inch, and back pressure valve 81 is adjusted to maintain a pressure on the sealing liquid in the stuffing box 8 of 1000 pounds per square inch, then valve 58 can be adjusted to release at about 1200 pounds per square inch thereby, in all probability, providing adequate protection for the equipment constituting the pumping system. When, however, the discharge pressure in conduit 13 is increased, valve 58 can be adjusted accordingly.

A manner of operation in which our invention will find particular application and one which is often encountered is in the passage of a relatively low-boiling liquid to a fractionating means under relatively high pressures. In Figure 1 such a manner of operation is diagrammatically illustrated.

For example, a stream comprising hydrogen and normally gaseous hydrocarbons, such as methane, $C_2$, $C_3$, $C_4$, and even heavier hydrocarbons, is charged to a fractionating tower 14 through conduit 15 controlled by valve 16. When the fractionator is operated to separate essentially methane and hydrogen from $C_2$, $C_3$, $C_4$ and any heavier hydrocarbons, as in demethanizer systems, at pressures of the order of 1000 pounds per square inch, a liquid comprising essentially $C_3$ hydrocarbons and some $C_2$ and $C_4$ hydrocarbons is passed into the upper part of the fractionator to be used as a reflux liquid therein. Such liquid can be charged by means of pump 10 through conduit 13 and valve 6 when valves 88 and 90 are closed. In steady operation methane and hydrogen together with a major portion of material, similar in composition to that passed through conduit 13, are removed as a vapor and/or gaseous fraction through conduit 39 controlled by valve 40 and passed through cooler 52, in which hydrocarbons heavier than methane are condensed, and through conduit 93 to another separating means 106, such as a flash vaporizer. In separating means 106, essentially methane and hydrogen are removed through conduit 101 controlled by valve 102, and heavier material, containing essentially $C_3$ and some $C_2$ and $C_4$ hydrocarbons are removed through conduit 107 controlled by valve 108. A kettle product comprising essentially $C_2$ and heavier hydrocarbons is removed from separating means 14 through conduit 19 controlled by valve 18.

Disregarding pressure drop through the conduit 13 and valve 6, the pressure in fractionator 14 is substantially the same as the discharge pressure of pump 10. When valve 49 is open, this pressure is communicated to sealing liquid 37 by means of conduit 17, which junctures conduit 39. Under such conditions the material in conduit 17 is in the vapor and/or gas phase and if miscible with the sealing liquid communicates with chamber 22, and if immiscible with the sealing liquid may communicate directly with chamber 31 as previously discussed in connection with material in conduit 17, which was in a fluid phase and passed therein through conduits 86 and 87. The sealing liquid system will operate substantially in the same manner as heretofore described.

After the pumping system is in a steady state of operation a liquid similar in composition to that charged as reflux liquid to fractional distillation column 14 may be obtained from separator 106 through conduit 107 and generally will comprise a substantial amount of the material charged through conduit 4 to pump 10.

The sealing liquid circulated to a stuffing box of pump 10, when such low-boiling hydrocarbons are being pumped at pressures of the order of 1000 pounds per square inch and substantially in the liquid phase, will comprise substantially any relatively viscous liquid material which will substantially prevent egress of such low-boiling hydrocarbons from the pump and which is of such a nature under the conditions of operation that there will be substantially no ingress of itself into the pump casing. Such specifications are substantially met by lubricating oil which in many instances will be preferred for sealing stuffing boxes of pumps which pump material less viscous than the lubricating oil.

When low-boiling hydrocarbons are being pumped through conduit 13 and the sealing liquid to pump 10 is essentially lubricating oil, another material, substantially immiscible and nonreactive with both the lubricating oil and low-boiling hydrocarbons and preferably having a low vapor pressure under the conditions of operation, is necessary to our invention. This material, designated by the numeral 23 in the drawings, may appropriately be glycerol, mercury or some similar substance, and under high pressure operation such material may comprise water.

Although our invention has been described in connection with sealing stuffing boxes of a single pump, it is within the scope of the invention that the stuffing boxes of a plurality of pumps operating at substantially equal discharge pressures can be sealed with sealing liquid the pressure of which is controlled by one central sealing liquid system and dependent, in part at least, on the discharge pressure of any one of the pumps, especially when such pumps are operating in parallel.

The operation will now be readily understood from the foregoing discussion and while we have shown a means for carrying out the various objects of the invention, it is evident that certain changes may be made in the detail construction without departing from the spirit of the invention.

We claim:

1. In a system for sealing a stuffing box of a pump employed to pump fluids at elevated pressures, means to circulate a sealing fluid in an endless circulatory cycle including said stuffing box as a part thereof and means placing the discharge fluid of said pump in pressure communication with the sealing fluid while preventing contact therewith thereby to impose upon said sealing fluid a pressure at least substantially equal to that of said discharge fluid.

2. In a system for sealing the stuffing box of a pump employed to pump fluids at elevated pressures and having an inlet for ingress of said fluid and a discharge outlet, a conduit forming a circuit including said stuffing box as a part thereof and containing a sealing fluid, a conduit connecting the fluid discharged from said pump with said circuit, means for transmitting the pressure of said fluid to the sealing fluid in said circuit while preventing contact of said fluids, a pressure control means in said second conduit, a second pump in said circuit located downstream from the point of connection of said discharge fluid conduit and said stuffing box to circulate said sealing fluid in said circuit and to impart to said sealing fluid additional increment of pressure over and above that existing in said discharge conduit.

3. A system as set forth in claim 2 in which a fluid immiscible with both said discharge fluid and said sealing fluid is disposed between the said discharge fluid and said sealing fluid to prevent contact therebetween.

4. In a system for sealing the stuffing box of a pump employed to pump fluids at elevated pressures, an endless conduit containing said stuffing box as a part thereof, a conduit communicating with the discharge outlet of said pump and said endless conduit, an incompressible fluid in said second conduit immiscible with both the fluid being pumped and the sealing fluid and so disposed therein as to separate said discharge fluid from said sealing fluid, and a pump in said endless conduit for circulating said sealing fluid therein.

5. In a system for sealing a stuffing box of a pump, a fluid sealing medium miscible with said fluid being pumped but differing in composition therefrom, means for circulating said fluid sealing medium through said stuffing box, means placing the outlet of said pump in fluid communication with said first named means, and a fluid immiscible with both said aforementioned fluids so placed in said last named means to insulate the discharge fluid from the sealing fluid.

WILLIAM B. REEVES.
EDWARD L. UTSINGER.